Dec. 9, 1941.           R. HAFNER                2,265,366
                    ROTARY WING AIRCRAFT
           Filed Oct. 16, 1937        4 Sheets-Sheet 3
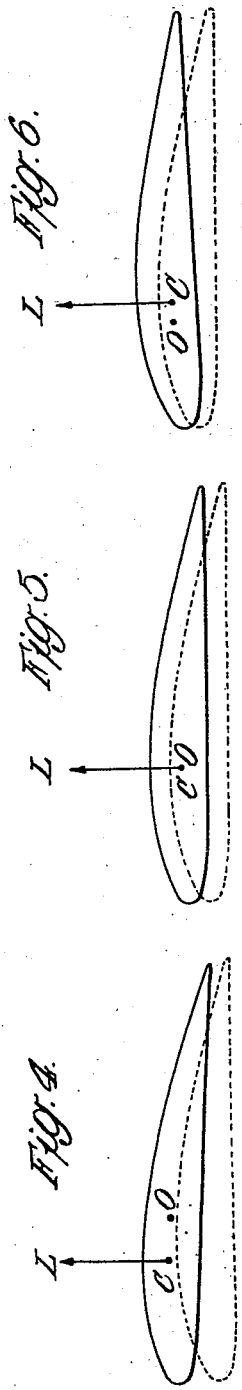
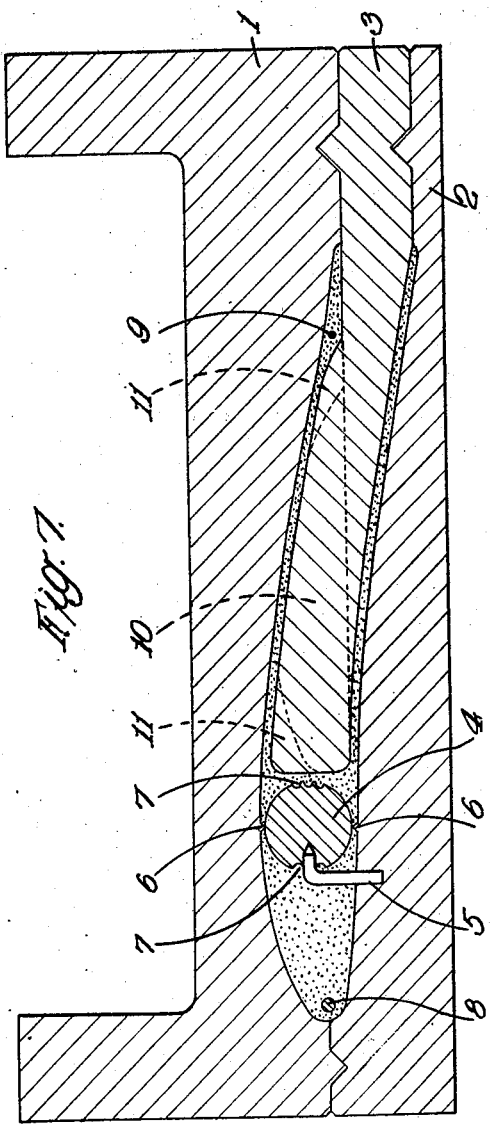
Raoul Hafner
   INVENTOR
By
   his ATT'Y.

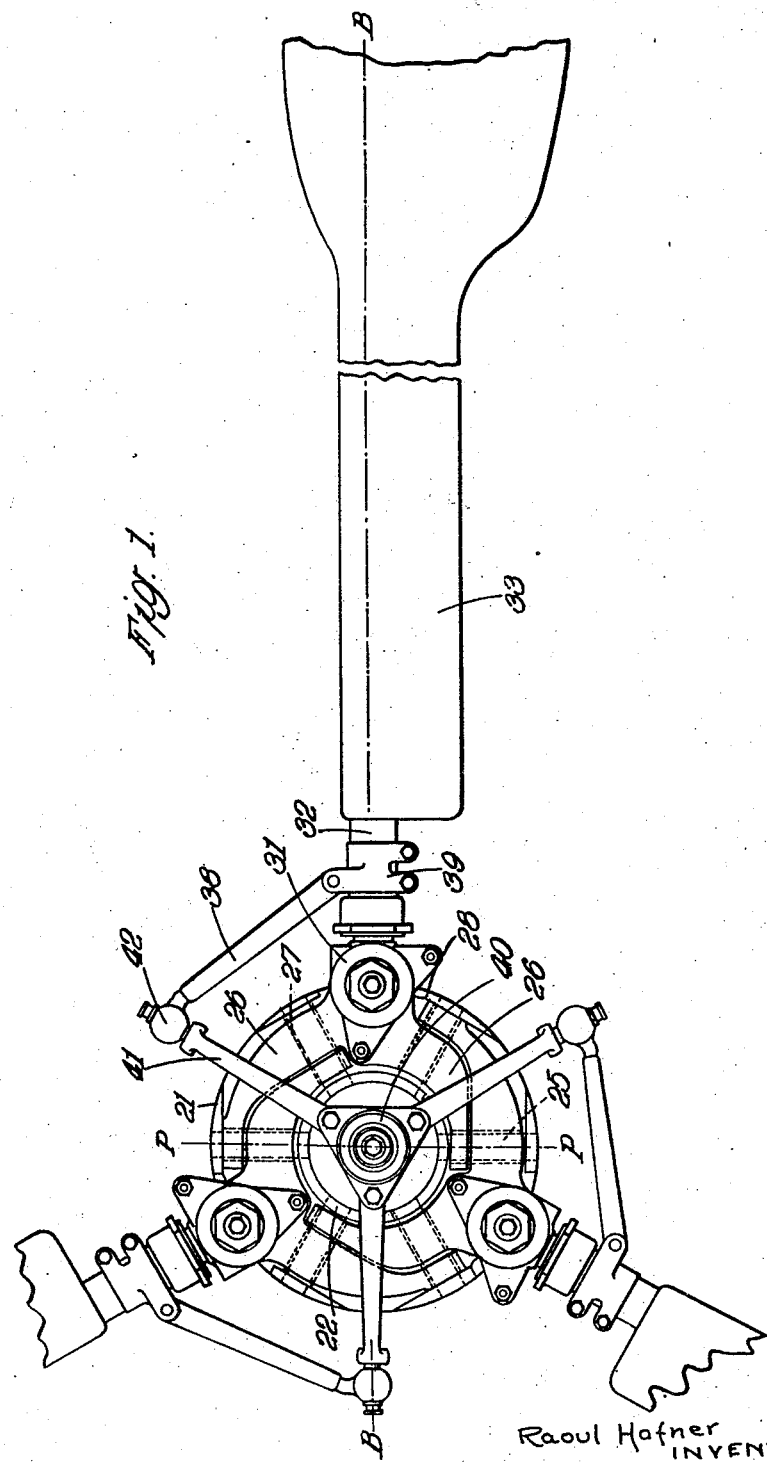

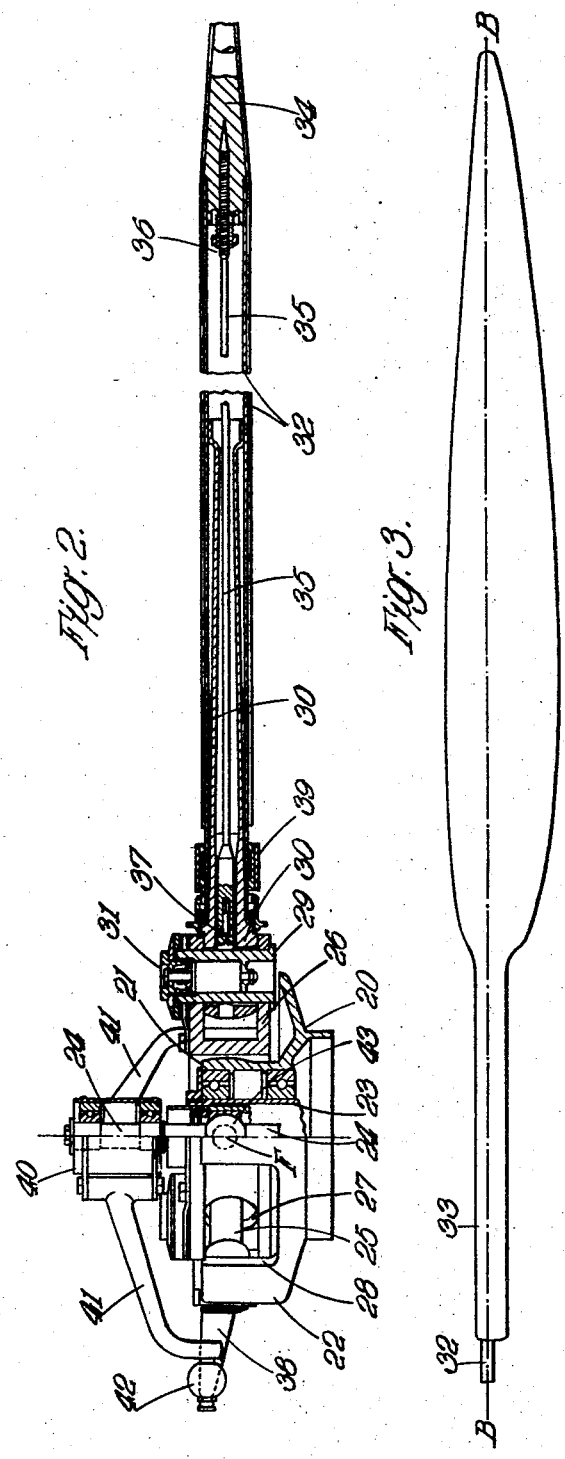

Dec. 9, 1941.   R. HAFNER   2,265,366
ROTARY WING AIRCRAFT
Filed Oct. 16, 1937   4 Sheets-Sheet 4
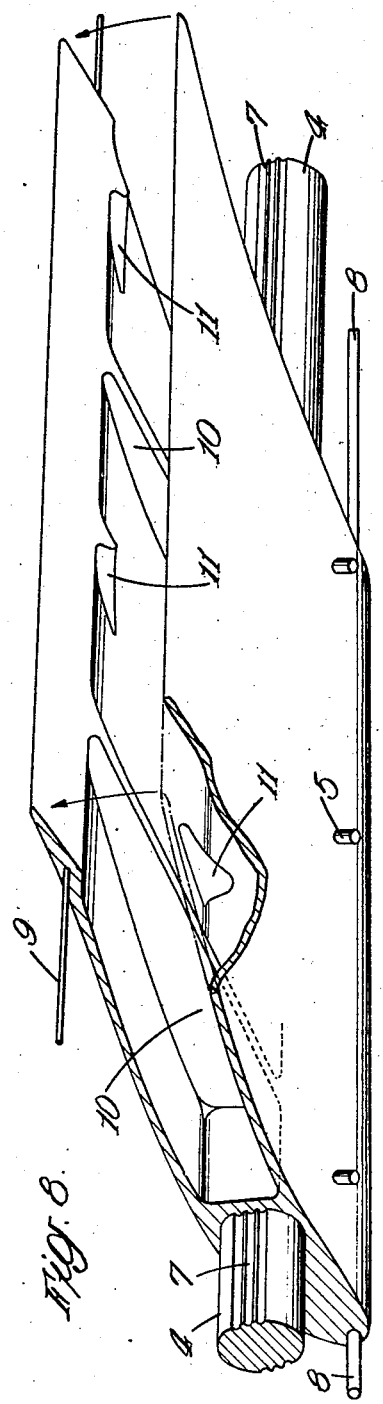
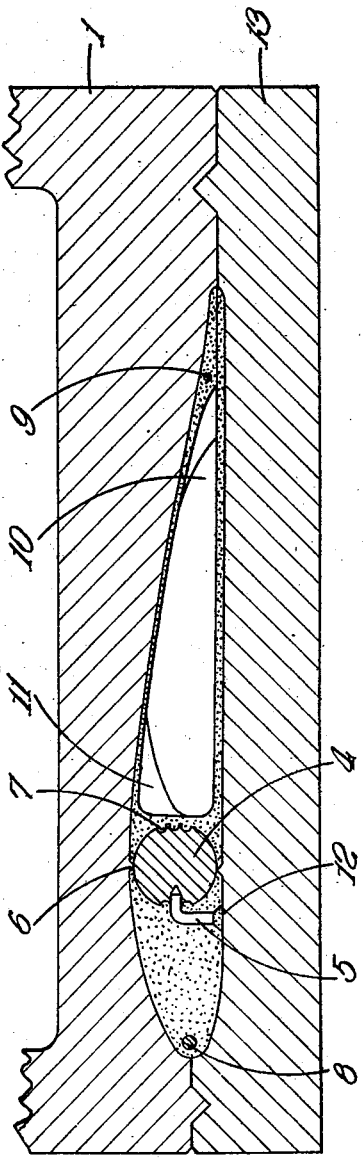
Raoul Hafner
INVENTOR
By Otto Munk
his ATTY.

UNITED STATES PATENT OFFICE 2,265,366

ROTARY WING AIRCRAFT

Raoul Hafner, Vienna, Austria

Application October 16, 1937, Serial No. 169,382
In Great Britain December 11, 1936

14 Claims. (Cl. 244—17)

This invention relates to the sustaining blades of rotary wing aircraft, of the kind comprising a plurality of blades radiating from a common rotary hub, and has particular though not exclusive reference to aircraft of this kind in which each blade is adjustable during flight about a pitch-change axis extending in the direction of its span.

It is an important object of the invention to provide a construction in which the inevitable fluctuations in the aerodynamical influence on a blade during flight may be arranged to produce a minimum of disturbance in the flying control means and/or general structure of the aircraft itself. Other important results are also achieved by the invention, and will be referred to in due course.

It has been proposed, in rotary wing aircraft of the kind referred to, and having each blade journalled to the hub about an individual pitch-change axis, so to construct each blade that the general centre of lift of the blade as a whole is not displaced by changes in incidence, and to arrange for the pitch-change axis to pass through this centre of lift and the centre of gravity of the blade as a whole.

The purpose of this arrangement was to avoid lift-mass couples about the pitch-change axis being caused by changes in pitch and reacting on the controls, but it took no account of the cyclic variation in the lift distribution along the blade, during forward flight, due to the cyclic variation in the relation between the rotary speed of the blade and the speed of the steady flight wind past it. Consideration will show that a span-wise oscillation of the general centre of lift is caused thereby, which in the general case will have a component in the direction of the chord (e. g. the centre of lift will oscillate along a curve) whether or not the arrangement is such that the position of this centre is unaffected by changes in incidence.

According to the present invention a sustaining blade is so constructed that, with changes in the lift distribution along its span, its general centre of lift moves along a substantially straight span-wise line, or axis of balance as it will hereinafter be termed, which passes through the general centre of mass of the blade.

The successive sectional elements of the aerofoil or lifting part of the blade (that is to say the parts lying between adjacent planes perpendicular to the span) may readily be so constructed and mutually disposed that their means centres of pressure lie on an axis of balance; it will of course be understood that the aerofoil sections chosen for the blade will be such that the positions of their centres of pressure will not be substantially affected by normal variations in blade incidence, for example certain sections having a slightly reflexed trailing edge may be used.

Preferably, for reasons which need not be considered here, the axis of balance passes not only through the general centre of mass of the blade as a whole but also through substantially all the individual centres of mass of the said sectional elements.

Now it will be appreciated that the axis of balance in the blade of the invention always passes through the mass and lift centres of the blade as a whole, whatever their relative positions at any instant. The invention therefore provides a predetermined axis of reference in the blade about which there are no fluctuating moments during flight, and the blade root attachments and/or flight control means may be so arranged in relation to this axis as to effect a general improvement in the smoothness of operation of the aircraft.

For example, in aircraft in which each blade is angularly adjustable during flight about an individual pitch-change axis, the latter may be arranged to coincide with the axis of balance of the blade, thus ensuring that no vibratory reactions will be transmitted to the pitch control means.

Additionally or alternatively, matters may be so arranged that this axis of balance intersects the rotational axis of the hub, at least in the mean flight disposition of the blade respectively to the hub. (This may be ensured, where the blade root articulation includes a "drag" axis allowing the blade to lag and advance somewhat during rotation, by arranging for the axis of balance to intersect such "drag" axis.) As a result, since there are no fluctuating moments about the axis of balance, there will be no tendency for any individual blade to impose torsional vibrations on the hub and thence on the aircraft structure, or on the flight control means where this operates by tilting the hub and is sensitive or "reversible."

It will be appreciated that the foregoing takes no account of the lift-mass couple acting on the blade in a plane including the axis of balance of the blades and transverse to the chord thereof. This couple maintains an upward flexure of the blade towards its tip, and its fluctuations are balanced by variations in its vertical reaction on the hub. With the object of minimizing undesirable effects due to this, according to a further feature of the invention, the blades may be hinged about "flapping" axes all intersecting the rotational axis of the hub, preferably at a single point. In such a case, the varying vertical reactions referred to will all act along the said rotational axis and their effects will be purely additive; they will not combine to produce vibratory couples on the hub or aircraft structure, and their resultant will only react on a hub-tilting flight control if the tilting axis or point is appreciably offset from the rotational axis of the hub. Moreover, in the preferred form of aircraft according to the invention three, or a multiple of three, blades are evenly spaced around the hub; in such cases the fluctuating reactions referred to tend to balance out in the manner of three simple harmonic functions 120° out of phase.

A very satisfactory practical form of sustaining rotor incorporating the foregoing features may be arrived at by associating three blades constructed in accordance with the invention with the hub and flight control means set out in our British Patent No. 435,818, the arrangement being such that the axis of balance of each blade coincides with the torsionally resilient tie member which lies within the blade root, anchors the blade radially to the hub, and is torsionally flexed by pitch changes.

An example of such an arrangement is illustrated by Figures 1 to 3 of the accompanying drawings, of which Figure 1 is a plan view showing the hub and parts of one blade;

Figure 2 is a side elevation thereof, largely in section;

Figure 3 is a plan view, on a smaller scale, of the entire blade;

Figs. 4 to 6 are diagrams of a blade profile with the neutral torsional axis disposed in three different positions, respectively, relative to the axis of balance;

Fig. 7 is a diagrammatic cross-sectional view of a partly completed blade according to the invention and of a mould which may be used in the initial stage of a process for producing such blade from synthetic resins;

Fig. 8 is a perspective view of the partly completed blade on a larger scale; and Fig. 9 is a diagrammatic cross-sectional view of the completed blade within the mould used for the second moulding step.

As will be clear from Figures 1 and 2, the rotary hub 20 is generally bowl-shaped with upstanding cylindrical inner and outer walls 21 and 22. The inner wall 21 is journalled upon a tubular axle 23 through which passes a vertical control column 24.

Three blades are provided, which are pivoted to the hub about individual flapping axes P—P (Figure 1) which are coplanar and intersect the rotational axis of the hub at a common point F. Flapping pins 25 are arranged on these axes and are carried at their inner and outer ends by the walls 21 and 22 of the hub, and the blade roots carry forks 26 which nest in regularly interlapping relationship in the annular space between these walls and are pivoted at their ends to the respective pins 25. The fork arms of each blade are cut away or apertured at 27 (Figure 2) to give passage to the flapping pins relating to the other blades.

The outer wall 22 of the hub is cut away at 28 in three places to accommodate the shanks of the forks 26 and these shanks carry vertical "drag" pivot pins 29 about each of which is pivoted the knuckle end of a short tubular blade-supporting arm 30. An adjustable friction damper 31 is associated with this pivot.

The root portion of the blade spar consists of a steel tube 32 which is provided with a streamline fairing 33 and is a sliding fit over the supporting arm 30, so that it may rock about its longitudinal axis to vary the blade pitch. The function of the arm 30 is to support the blade when at rest, and there is of course no substantial friction between these parts when the aircraft is in flight.

The outer end of the tubular spar root is secured to the inner end of the blade spar proper (34), which is much thicker-walled than the root portion 32, and may in fact be solid. The spar has thus at its root a greater depth but less weight per unit length than intermediately in its length towards the tip; this arrangement gives not only the requisite root stiffness for support of the blade when at rest, but also the best distribution of mass for the storage of a large amount of excess kinetic energy at a reasonable excess rotor speed. The second-mentioned feature is of importance in effecting a direct take-off by altering the general pitch of the rotor so as to convert such excess energy into positive lift, and it may be noted that the relative thinness of the spar proper contributes in this respect, in enabling the fast-moving blade proper to be constructed with a thin aerofoil section having a low drag.

The blade is anchored internally and radially to its root articulations by a torsionally resilient tie member 35, in the form of a steel rod swaged up and externally threaded at its ends, and lying along the common axis of the spar root 32 and the supporting arm 30. At its outer end the tie rod 35 is screwed into a tapped axial boring in the blade spar 34 and secured against rotation by a nut and tapered collet arrangement indicated at 36, and at its inner end it engages with an internal screwthread in the supporting arm 30 and is similarly secured by a screwed plug and taper pin assembly 37.

The blade pitch is controlled by a radius arm 38 which is pivoted about a vertical axis to a clamp 39 secured around the spar root and projects generally forwardly of the blade in the direction of rotation. The upper end of the central control column 24 projects above the hub and carries a rotary head 40, from which three spider arms 41 project. The latter curve somewhat downwardly and their free ends are ball-jointed at 42 to the free ends of the radius arms 38. One of the spider arms is rigidly secured to the rotary head 40 in the manner of a "master" arm, but the other two arms are pivoted at their roots about vertical axes to the rotary head; the mutual angular disposition of these arms can thus vary slightly in accordance with movements of the blades about their "drag" pivots.

By sliding the control member 24 vertically over a small range the pitch of the rotor may be adjusted as a whole, whilst if the said column is tilted in any direction about the ball joint 43 the geometrical blade pitches are varied cyclically or "differentially" and settles down to rotation in the same general tilted plane as the ball joints 42. It should be noted that the joint 43 is so placed that tilting of the control assembly takes place substantially about the point F, which is in turn the point about which the true rotary axis of the blade system is tilted.

Variation of the pitch of a blade is opposed only by the torsional resilience of its tie rod, there being no frictional restraint as would be the case if thrust bearings were used at the blade roots. This is of particular importance at times when the blade pitches are changing "differentially," since each blade anchorage produces a harmonically varying reaction on the control assembly instead of a frictional reaction which would be constant in value and subject only to rapid reversal. Moreover, where there are three or a multiple of three blades these harmonic variations will sum to zero at any instant, leaving only (as consideration will show) a basic steady reaction urging the control system resiliently to its central position.

As shown by Figure 3, each blade is tapering or "lancet-shaped" in plan, and of course its spar and thickness taper correspondingly. Such a shape is that most suited to the special requirements of rotary sustaining blades (for reasons which need not here be discussed), and, in accordance with what has previously been set forth herein, is so built up on its spar that the centres of mass and means centres of pressure of all its sections lie on the axis B—B of its spar. This axis is therefore the "axis of balance" of the blade and evidently intersects the "drag" and "flapping" axes of the blade and also (in the mean flight position of the blade) the general rotary axis at the point F.

In the above arrangement, thereof, the general rotary axis of the rotor and the "flapping" axes, axes of balance, and pitch-change axes of the blades all mutually intersect at a single "focal" point F, about which a central flight control member is universally tiltable to vary the blade pitch angles cyclically or "differentially," and the general aerodynamic merit of such an arrangement will be evident.

The various expedients above set out have the effect, inter alia, of minimising or obviating torsional reactions at the blade root and, conversely, any torsional oscillation or flutter of the blade which would tend to set up such reactions.

There is, however, another type of flutter to which blades are liable during flight, in which the blade is oppositely twisted, at any instant, at different points in its span, no reaction being in this case set up at the root, and it is a further important object of the invention to provide a blade which is not liable to "internal" flutter of this kind. This is particularly desirable since the sustaining blades of rotary wing aircraft are unlike fixed wings and airscrew blades in having no great torsional stiffness, yielding resiliently to forces tending to twist them. Any consequent torsional flutter is therefore likely to be of appreciable amplitude and to have a serious effect on the efficiency of a blade.

With the object of avoiding such "internal" flutter, a blade according to the invention (e. g. that of Figure 3) may be further so constructed that its neutral torsional axis (hereinafter defined) is at or slightly in front of the axis of balance thereof. The effect of this may be explained as follows:

In each of the diagrams forming Figures 4 to 6 of the accompanying drawings, the dotted outline represents the blade section, at the lift centre of the blade as a whole, in a steady flight position, and the full outline this section as deflected by a fortuitous increase in the lift L acting at the lift centre C, which latter is of course on the axis of balance in a blade according to the invention.

Now in this (or any) section of a blade there is one point, positioned in the chord according to the blade structure, where an applied vertical thrust will cause equal degrees of flexure of the leading and trailing edges, i. e. will cause no change in incidence. This point is marked O in Figures 4 to 6, and its locus along the blade is what has been above referred to as the "neutral torsional axis" of the blade.

In Figure 4 the point O is behind the axis of balance or lift centre C, and an increase in lift L, besides upwardly flexing the blade as a whole, will therefore twist it in such a sense as to increase its angle of attack and so aggravate the original disturbing factor. At the same time the mass inertia of the blade, acting downwardly at a point on the axis C further towards the root, will twist that part of the blade oppositely to decrease its angle of attack and aggravate the downward component acting upon it.

Thus the inevitable fluctuations of lift on this blade cause twisting couples to be applied thereto about the neutral torsional axis, which build up against the torsional resilience of the blade and set up "internal" flutter thereof. It may be remarked that Figure 4 is typical of the customary rotary blade, in which the wood or metal surface (necessary to withstand the high aerodynamic loading) forms a stress-carrying skin and causes the axis O to lie towards the mid-span position.

Figure 5 illustrates the behaviour of a blade according to the invention in which the axes O and C are approximately coincident. In this case variations in the lift and mass forces will obviously cause pure flexing of the blade without torsional stress therein, and such a blade may be regarded as having "neutral" stability from the present point of view.

In Figure 6 a modified blade according to the invention is shown in which the axis O is slightly in advance of the axis of balance C. In this case the blade will be slightly twisted, but always in such a sense as to offset the effect of initiating force; such a blade therefore has positive stability from the present viewpoint.

It will of course be understood that whilst the blades of Figures 5 and 6 are in any case a distinct advance on that of Figure 4, it will always be of advantage to use aerofoil sections in which the centre of pressure is substantially stationary, or moves slightly in the stabilising direction, with alterations in incidence, for example certain sections having a reflexed trailing edge.

The above principle may obviously be carried into practice in a number of alternative ways. In the case of hollow stressed-skin blades the nose portion may be reinforced to the requisite extent by an extra layer or layers of material in order that it may predominate in taking the bending loads on the blade, this of course bringing the neutral torsional axis forward as required. Alternatively the nose portion may comprise material having a higher modulus of elasticity than the remainder, for example steel as against as aluminium, magnesium or other light alloy for the rest of the blade. Both these expedients will also bring the mass centres of the sections correspondingly forward; any separation of these from the mean centre of pressure will therefore be slight, and a very small amount of nonstructural mass suitably incorporated in the blade will suffice to correct it.

Where blades according to the invention are built up on a load-carrying spar situated at the axis of balance of the blade, the built-up portion may be formed of a material whose modulus of elasticity is so much lower than that of the spar as not to relieve the latter appreciably of its loads. The neutral torsional axis of the composite blade will thus be that of the spar, and consequently will remain at the axis of balance as required. Such a blade might be regarded as a structural spar or beam carrying a non-structural aerofoil fairing for imparting lift thereto.

As regards the material for this fairing, certain mouldable materials of the synthetic resin or "plastics" class have physical properties which appear to render them entirely suitable for this purpose in association with a steel spar, and we therefore propose to produce a preferred constructional form of blade according to the invention, for example, that of Figure 3, by moulding such material about a spar of this kind.

Figures 7 to 9 of the accompanying drawings illustrate the formation of a blade in this way, by a two-stage moulding process, Figures 7 and 9 being diagrammatic cross-sectional views of the mould and its contents in the first and second stages respectively, and Figure 8 being an enlarged perspective view of a length of the blade before the second and final stage.

The mould for the first stage comprises upper and lower dies 1 and 2 and an interposed die or core 3, these being shaped and assembled as shown in Figure 7, so that the blade is initially formed with a solid nose portion in which the steel spar 4 is embedded. During moulding, the spar is positively located between the dies 1 and 2 by spaced pegs 5 upstanding from sockets in the lower die 2 and fitting laterally into holes spaced along the front of the spar. As a further precaution against the spar moving vertically and weakening the thin moulded covering above and below it, it is located between rows of spaced raised points 6 on the dies 1 and 2.

The spar 4 is provided with longitudinal flutings 7 or the equivalent to provide a key for the moulded material, and the pegs 5 are also of service in this connection.

Steel wires 8 and 9 are strung in the spaces forming the leading and trailing edges respectively of the blade in order to give the latter strength in tension, in which the moulded material is apt to be deficient, and in the particular construction shown the leading edge wire 8 is of relatively heavy gauge for a reason subsequently explained.

At the conclusion of this stage the blade has the form shown in Figure 8, with the upper and lower skins behind the spar evenly separated over their entire length right back to their trailing edges, triangular ribs 10 and angle webs 11 having been moulded on the underside of the upper skin by appropriate slots in the upper side of the core die 3.

The dies 2 and 3 having been removed, the projecting pegs 5 are cut off flush and drilled out to a predetermined depth, the surrounding material is countersunk, and a plug 12 is inserted (see Figure 8) for incorporation in the structure by the second stage of the process.

In this, a lower die 13, shaped as shown in Figure 9, is placed in position and heat applied to unite the lower skin to the ribs 10 and seal the trailing edge, after which the blade is in its final shape ready for finishing, for example ironing out or filling in the pin-pricks caused by the spar-locating points 6 of the dies.

In a blade so constructed, as previously explained, the neutral torsional axis is substantially that of the spar, and may therefore readily be placed at or slightly in front of the axis of balance of the blade. The mass of the solid nose portion of course more or less balances that of the more extensive but cellular remainder of the blade. In the particular case shown, it is estimated that the mass centres of the blade sections will be brought thereby almost to their centres of pressure, and the remaining discrepancy will be removed by the use of a suitably heavy gauge for the leading edge wire J to form a non-structural balancing mass.

It may perhaps also be noted that the density of the nose portion as compared with the trailing portion, has also the effect of equalising any slight stress-carrying actions by these parts, and so completely eliminating any minor effect they might otherwise have on the position of the neutral torsional axis of the blade.

The preferred way of carrying out the invention by moulding the blades around their spars has a number of important advantages in practice, among which may be mentioned the following:

The blades may be cheaply and rapidly produced in large numbers and will be exactly similar and interchangeable in all respects. This is true not only of blades having a uniform section over most of their length but also of those shaped more in accordance with the special requirements of rotary wings, for example, those having a progressive change in section and blades tapering or "lancet" shaped in plan.

The moulded material takes a high finish, with a consequent reduction in drag, and is superior to wood both as regards homogeneity and freedom from warping and splitting tendencies. Additionally, the latter qualities permit the adoption of a simple jointless structure such as that shown, which is very considerably lighter than an equivalent built-up wooden blade.

A further point which may be noted is that owing to the different co-efficients of thermal expansion of the spar and the moulded material, the longitudinal shrinkage of the spar on cooling will place the remainder of the blade under a permanent compression, which will subsequently offset the disruptive influence of centrifugal force during flight.

There are many materials of the synthetic resin or "plastics" class suitable for the construction by moulding of blades according to the invention. In particular, we contemplate using transparent or translucent materials of the "plastic glass" type; a supporting rotor incorporating blades formed therefrom would be attractive in appearance, inconspicuous in flight, and would substantially eliminate the distracting flickering in the pilot's eyes frequently present when rotary wing aircraft are flown or landed facing a strong sun.

What I claim and desire to secure by Letters Patent of the United States is:

1. In or for rotary wing aircraft, a sustaining blade the successive sectional elements of whose lifting portion are each of an aerofoil shape having a substantially stationary center of pressure and are mutually disposed with said centers of pressure all on a straight spanwise axis of balance passing through the general center of mass of said blade.

2. In or for rotary wing aircraft, a sustaining blade the successive sectional elements of whose lifting portion are each of an aerofoil shape having a substantially stationary center of pressure and are mutually disposed with their individual centers of pressure and of mass all on a common straight spanwise axis of balance.

3. In or for rotary wing aircraft, a sustaining blade the successive sectional elements of whose lifting portion are each of an aerofoil shape having a substantially stationary center of pressure and are mutually disposed with said centers of pressure all on a straight spanwise axis of balance passing through the general center of mass of said blade, said blade having its neutral torsional axis in the part bounded rearwardly by said axis of balance.

4. In or for rotary wing aircraft, a sustaining blade the successive sectional elements of whose lifting portion are each of an aerofoil shape having a substantially stationary center of pressure and are mutually disposed with their individual centers of pressure and of mass all on a common straight spanwise axis of balance substantially coincident with the neutral torsional axis of said blade.

5. In or for rotary wing aircraft, a sustaining blade constructed in accordance with claim 4, and being of a tapering or lancet shape in plan view.

6. In or for rotary wing aircraft, a sustaining blade constructed in accordance with claim 4, said blade comprising a stressed metal skin augmented as to mass and stiffness in front of said axis of balance.

7. In or for rotary wing aircraft, a sustaining blade constructed in accordance with claim 4, said blade comprising a stressed metal skin augmented as to thickness in front of said axis of balance.

8. In or for rotary wing aircraft, a sustaining blade constructed in accordance with claim 4, said blade comprising a stressed metal skin and a reinforcement in the nose portion of a metal having a higher specific gravity and modulus of elasticity than the metal of said skin.

9. In or for rotary wing aircraft, a sustaining blade constructed in accordance with claim 4, said blade comprising a metal spar at said axis of balance and a blade shape formed around said spar from a material having a modulus of elasticity greatly inferior to that of said spar.

10. In or for rotary wing aircraft, a sustaining blade constructed in accordance with claim 4, said blade comprising a steel spar at said axis of balance and a blade shape molded around said spar from a synthetic resin material.

11. In or for rotary wing aircraft, a sustaining blade constructed in accordance with claim 4, said blade comprising a steel spar at said axis of balance and a blade shape molded around said spar from a transparent or translucent synthetic resin material.

12. A rotary wing aircraft comprising a plurality of sustaining blades each constructed in accordance with claim 4 radiating from a rotary hub structure and each articulated to said hub structure about a pitch-change axis coincident with its said axis of balance.

13. A rotary wing aircraft comprising a plurality of sustaining blades each constructed in accordance with claim 4 radiating from a rotary hub structure and each articulated to said hub structure about a pitch-change axis coincident with its said axis of balance, and torsionally resilient means anchoring each blade radially to said hub structure against centrifugal force in flight and torsionally flexed by changes in pitch.

14. A rotary wing aircraft comprising a plurality of sustaining blades each constructed in accordance with claim 4 radiating from a rotary hub structure and each articulated to said hub structure about a pitch-change axis coincident with its said axis of balance and about a flapping axis, all said axes intersecting the rotary axis of said hub structure substantially at a single point.

RAOUL HAFNER.